United States Patent
Bloom et al.

(10) Patent No.: US 8,538,142 B2
(45) Date of Patent: Sep. 17, 2013

(54) FACE-DETECTION PROCESSING METHODS, IMAGE PROCESSING DEVICES, AND ARTICLES OF MANUFACTURE

(75) Inventors: Daniel Bloom, Loveland, CO (US); Clay Jessen, Denver, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 314 days.

(21) Appl. No.: 12/997,683

(22) PCT Filed: Jun. 26, 2008

(86) PCT No.: PCT/US2008/068424
§ 371 (c)(1),
(2), (4) Date: Dec. 13, 2010

(87) PCT Pub. No.: WO2009/157939
PCT Pub. Date: Dec. 30, 2009

(65) Prior Publication Data
US 2011/0097000 A1     Apr. 28, 2011

(51) Int. Cl.
*G06K 9/00* (2006.01)
(52) U.S. Cl.
USPC ............... 382/165; 382/118; 382/224
(58) Field of Classification Search
None
See application file for complete search history.

(56) References Cited

U.S. PATENT DOCUMENTS

| 7,190,829 B2 * | 3/2007 | Zhang et al. | 382/165 |
| 2004/0017930 A1 | 1/2004 | Kim et al. | |
| 2004/0017933 A1 * | 1/2004 | Lestideau | 382/118 |
| 2006/0029265 A1 | 2/2006 | Kim et al. | |
| 2006/0228017 A1 * | 10/2006 | Kuramasu et al. | 382/141 |

FOREIGN PATENT DOCUMENTS

| KR | 10-2004-0008791 A | 1/2004 |
| KR | 10-2004-0079804 A | 9/2004 |
| KR | 10-2006-0012777 A | 2/2006 |
| KR | 10-2007-0017809 A | 2/2007 |

OTHER PUBLICATIONS

The International Search Report and the Written Opinion of the International Searching Authority for International Application No. PCT/US2008/068424 dated Dec. 9, 2008, pp. 10.
Chinese Office Action, Chinese Application No. 20088013 002.5, Date: Apr. 25, 2012, pp. 1-6.

* cited by examiner

*Primary Examiner* — Stephen R Koziol
*Assistant Examiner* — Raphael Schwartz

(57) ABSTRACT

Face-detection processing methods, image processing devices, and articles of manufacture are described. According to one arrangement, a face-detection processing method includes accessing image data of a plurality of images to be processed for detection of human faces in the images, determining whether or not to use skin-detection processing for face-detection processing of individual ones of the images, and in accordance with the determining, performing the face-detection processing of one of the images using the skin-detection processing to detect human faces in the one of the images and performing the face-detection processing of another of the images without using the skin-detection processing to detect human faces in the another of the images.

18 Claims, 2 Drawing Sheets

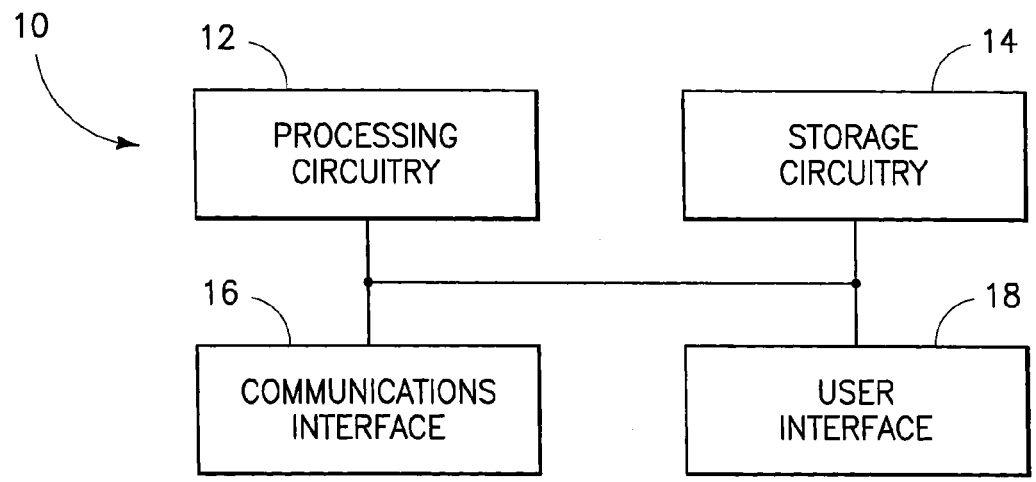
_Fig 1_
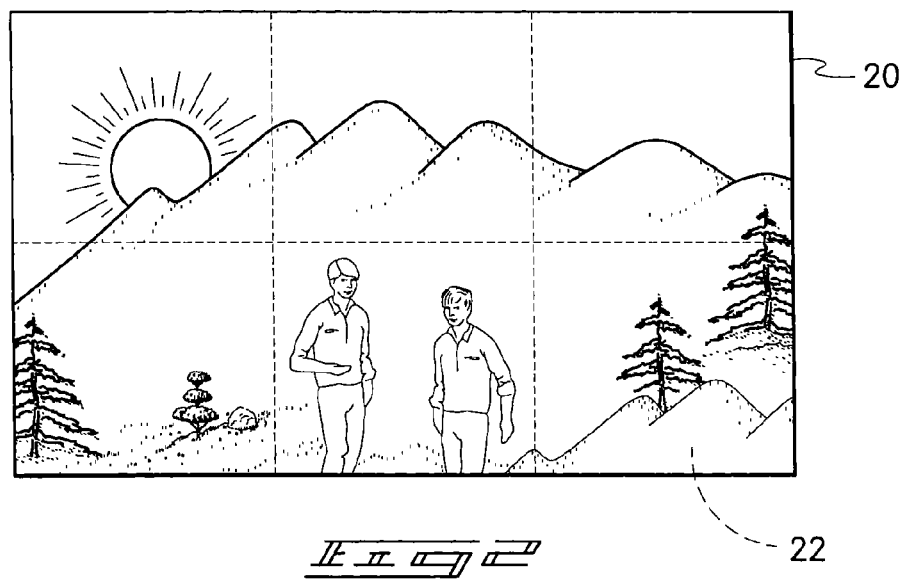
_Fig 2_

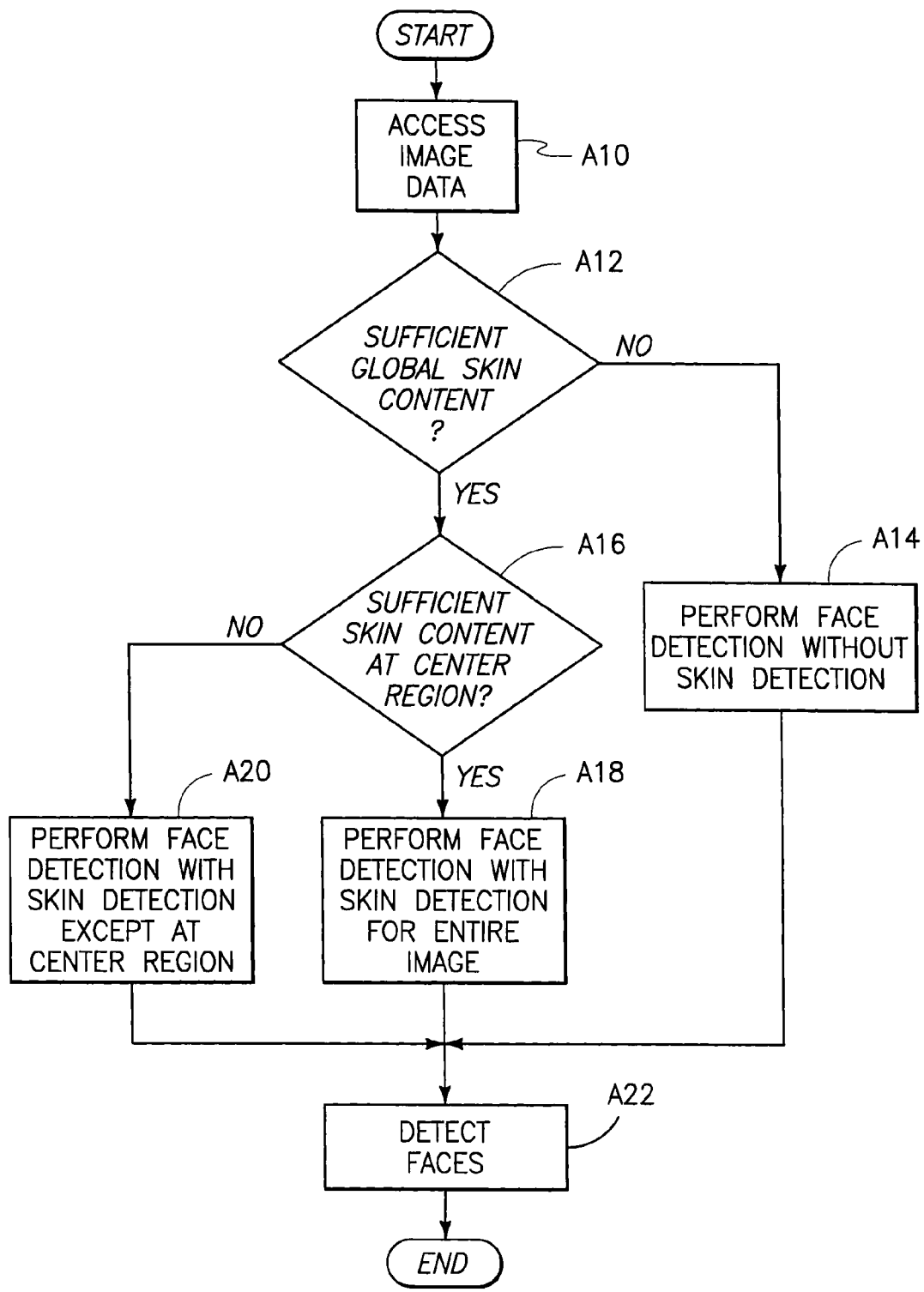

FACE-DETECTION PROCESSING METHODS, IMAGE PROCESSING DEVICES, AND ARTICLES OF MANUFACTURE

FIELD OF THE DISCLOSURE

Aspects of the disclosure relate to face-detection processing methods, image processing devices, and articles of manufacture.

BACKGROUND OF THE DISCLOSURE

Digital imaging devices and digital imaging processes have gained wide acceptance in professional and consumer use. Digital representations of images may be easily communicated, stored, manipulated, etc. Digital information of images may be processed by various devices, such as image capture devices, or other devices, such as computers, after the images have been captured. Furthermore, the types of images which may be processed are varied and may include photographs, still images from videos, and so on. Some types of image processing may attempt to locate objects of interest in an image. For example, some image processing may attempt to locate human faces in an image. Processes of detecting objects (e.g., faces) may be useful for user interfaces, the scanning of image databases, teleconferencing, and additional electronic processing of images. However, some face-detection processes utilize relatively significant hardware resources and/or processing time to process images which may be unsuitable for some applications.

SUMMARY

According to some aspects of the disclosure, face-detection processing methods, image processing devices, and articles of manufacture are described.

According to one aspect, a face-detection processing method comprises accessing image data of a plurality of images to be processed for detection of human faces in the images, determining whether or not to use skin-detection processing for face-detection processing of individual ones of the images, and in accordance with the determining, performing the face-detection processing of one of the images using the skin-detection processing to detect human faces in the one of the images and performing the face-detection processing of another of the images without using the skin-detection processing to detect human faces in the another of the images.

Other embodiments and aspects are described as is apparent from the following discussion.

DESCRIPTION OF THE DRAWINGS

Fig. 1 is a functional block diagram of an image processing device according to one embodiment.

FIG. 2 is an illustrative representation of an image according to one embodiment.

FIG. 3 is a flow chart of face-detection processing of an image according to one embodiment.

DETAILED DESCRIPTION

Some embodiments of the disclosure are directed towards image processing methods and image processing devices. In more specific embodiments, methods and apparatus are disclosed for locating objects, such as human faces, in images. Face-detection processing may be performed before an image is captured (e.g., and may be used to assist with generation of image data of the image corresponding to the capture of the image in one embodiment) and/or after capture of an image. In some embodiments, skin-detection processing may also be performed to analyze images for the presence of human skin content. The skin-detection processing may be executed as a pre-filter to a face-detection method in one embodiment to improve the efficiency of execution of the face-detection method. As described below, at least some embodiments of the disclosure are directed towards improving the accuracy and efficiency of face-detection processing with respect to locating human faces in images.

Referring to FIG. 1, one embodiment of an imaging device 10 is shown. The imaging device 10 may be configured differently in different embodiments. In one embodiment, imaging device 10 is configured as an image capture device (e.g., still camera or video camera) to capture received light of a scene and to generate digital image data (e.g., RGB data of pixels of a photograph) of the scene during image capture. Face-detection processing of the present disclosure may be performed to configure the image capture device during capture of the scene. For example, focus, exposure or other parameters may be adjusted using human faces located during face-detection processing. In other embodiments, imaging device 10 may be configured to process image data after an image has been captured. For example, the imaging device 10 may be configured as a personal computer configured to process image data of one or more previously captured images to identify human faces present in the images, and which may be used for additional processing of the images in one embodiment.

In the depicted embodiment of FIG. 1, the imaging device 10 includes processing circuitry 12, storage circuitry 14, a communications interface 16 and a user interface 18. Other embodiments of imaging device 10 are possible including more, less and/or alternative components. For example, imaging device 10 configured as a camera may include an optical system (not shown) to receive and focus light of a scene and a sensor configured to generate digital image data responsive to the received light.

In one embodiment, processing circuitry 12 is arranged to process data, control data access and storage, issue commands, and control other desired operations. Processing circuitry 12 is configured to perform face-detection processing operations according to one embodiment. Processing circuitry 12 may comprise circuitry configured to implement desired programming provided by appropriate media in at least one embodiment. For example, the processing circuitry 12 may be implemented as one or more of processor(s) and/or other structure configured to execute executable instructions including, for example, software and/or firmware instructions, and/or hardware circuitry. Exemplary embodiments of processing circuitry 12 include hardware logic, PGA, FPGA, ASIC, state machines, and/or other structures alone or in combination with a processor. These examples of processing circuitry 12 are for illustration and other configurations are possible.

The storage circuitry 14 is configured to store programming such as executable code or instructions (e.g., software and/or firmware), electronic data, databases, or other digital information and may include processor-usable media. Storage circuitry 14 stores programming configured to control processing circuitry 12 to perform face-detection processing operations in one embodiment, Processor-usable media may be embodied in any computer program product(s) or article of manufacture(s) which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

Communications interface 16 is arranged to implement communications of imaging device 10 with respect to external devices not shown. For example, communications interface 16 may be arranged to communicate information bi-directionally with respect to imaging device 10. Communications interface 16 may be implemented as a network interface card (NIC), serial or parallel connection, USB port, Firewire interface, flash memory interface, floppy disk drive, or any other suitable arrangement for communicating with respect to imaging device 10. Processing circuitry 12 may access image data to be processed via communications interface 16 from externally of imaging device 10 in one embodiment (e.g., where imaging device 10 is implemented as a personal computer). In other embodiments (e.g., imaging device 10 is implemented as a camera), image data may be generated internally of the imaging device 10 and accessed by the internal processing circuitry 12.

At least some embodiments or aspects described herein may be implemented using programming stored within appropriate storage circuitry described above and/or communicated via a network or other transmission media and configured to control appropriate processing circuitry. For example, programming may be provided via appropriate media including, for example, embodied within articles of manufacture. In another example, programming may be embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via a communications interface, or provided using other appropriate communication structure. Exemplary programming including processor-usable code may be communicated as a data signal embodied in a carrier wave in but one example.

User interface 18 is configured to interact with a user including conveying data to a user (e.g., displaying data for observation by the user, audibly communicating data to a user, etc.) as well as receiving inputs from the user. Accordingly, in one exemplary embodiment, the user interface 18 may include a display configured to depict visual information (e.g., a live display of a camera configured to depict detected faces in an image) as well as a suitable input device configured to receive user inputs. Any other suitable apparatus for interacting with a user may also be utilized.

An mentioned above, imaging device 10 is configured to access image data of an image and to process the image data in an attempt to detect and/or locate objects, such as one or more human faces, present in the image. In one embodiment, imaging device 10 is configured to implement one of a plurality of different face-detection processes to identify one or more human faces present in an image. In one embodiment, the different face-detection processes include executing a face-detection method with skin-detection processing (e.g., executing skin-detection processing for either an entirety of the image or less than an entirety of the image) or executing the face-detection method without skin-detection processing.

An example face-detection method which may be executed with or without skin-detection processing is described in U.S. Pat. No. 7,099,510 to Jones, assigned to the assignee hereof.

In a more specific embodiment, imaging device 10 is configured to execute the above-described face-detection method where different portions of the image are scanned, for example in a raster, to detect the presence of human faces in the respective different portions. For example, referring to FIG. 2, image data of an example image 20 may be scanned and processed in six respective different portions 22 to perform the face-detection processing including detecting whether a human face is present in any of the portions 22.

In some embodiments, a skin-detection method may be executed in an attempt to make the execution of the face-detection method more efficient compared without execution of the skin-detection method. In one embodiment, a skin-detection method may be executed as a pre-filter with the face-detection method. For example, the processing circuitry 12 executing the skin-detection method as a pre-filter may analyze the different portions 22 of the image 20 individually before execution of the face-detection method for the respective portions 22. In one embodiment, execution of the skin-detection method for a given portion 22 is faster and/or not as computationally intensive as executing the face-detection method for the respective portion 22 and efficiencies may be gained by running face-detection with skin-detection as discussed further below. Accordingly, in one embodiment, use of the skin-detection processing for the face-detection processing may expedite the face-detection processing compared with face-detection processing without skin-detection processing. One example of skin-detection processing is described in Handbook of Face Recognition by Stan Z. Li & Anil K. Jain published by Springer 2004 ISBN0-387-40595-X.

In one embodiment using skin-detection processing as a pre-filter, the skin-detection processing initially attempts to determine if a given portion 22 of the image 20 is void of sufficient human skin content and accordingly the given portion 22 need not be subsequently analyzed using the face-detection method. In one embodiment, for the given image 22, the skin-detection processing analyzes the amount of human skin content present (e.g., number of pixels including image data corresponding to human skin) in a given portion 22 and indicates that faces are not present in the portion 22 if the amount of human skin content present in the portion 22 is less than a threshold. Accordingly, the face-detection method may not be performed for the given portion 22 which was indicated to be void of sufficient human skin content to improve the efficiency of the face-detection processing compared with not analyzing the image for the presence of human skin. Alternatively, the skin-detection processing may also indicate that sufficient human skin content is present in a given portion 22 of the image 20 if the amount of human skin content present in the portion 22 exceeds a threshold and the face-detection method may be executed for the given portion 22 in an attempt to locate human faces in the portion 22.

However, the skin-detection processing may not accurately determine an amount of human skin present in a portion of an image in some imaging situations. For example, in some imaging conditions, image data of a scene may be not be accurately color balanced (e.g., in a multi-illuminant situation where different illuminating sources are present such as natural light through a window and artificial light generated by an interior light source). Images which are not correctly color balanced (e.g., the chrominance selection by the camera is in error) are one example of an imaging condition where the skin-detection processing may fail to correctly determine an amount of human skin present in a portion of the image being analyzed and which may result in the skin-detection processing falsely indicating that a human face is not present in the portion of the image and the face-detection processing need not be performed for the portion thereby resulting in error with respect to the portion.

In one embodiment, imaging device 10 may execute one of a plurality of different face-detection processes to increase the accuracy of face-detection operations of imaging device 10, for example, with respect to multi-illuminant or other images while still providing benefits of skin-detection processing such as improved efficiency. One process is to perform face-detection processing of an image without skin-detection. Another process is to perform the skin-detection processing of only a portion of an image during the face-detection processing. Yet another method is to perform the skin-detection processing of an entirety of the image during the face-detection processing. As described below in one example, the image data of the image being analyzed may be used to select one of the different face-detection processes for use in processing of the image.

Referring to FIG. 3, an example flow chart for selecting one of a plurality of face-detection processes is shown according to one embodiment. The flow chart may be performed by processing circuitry 12 according to one embodiment. Other methods are possible including more, less and/or alternative acts.

The depicted flow chart illustrates one example method of selecting one of a plurality of different face-detection processes for detecting human faces in an image. For example, the illustrated method determines whether or not to use skin-detection processing for face-detection processing of an image. A first process described below at act A14 performs face-detection processing without skin detection processing. A second process described below at act A18 performs face-detection processing with skin detection processing for an entirety of the image. A third process at an act A20 performs face-detection processing with skin-detection processing for less than an entirety of the image (e.g., skin-detection processing may be omitted at a center region of the image in one embodiment). In one embodiment, the method may be repeated for each image to be processed to select one of the processes on an image-by-image basis.

In the example method described below, the image data of the image may be analyzed or otherwise used to determine which of the plurality of face-detection processes is appropriate for processing of the image. For example, the selection may be based upon an amount of human skin content in the image as discussed above.

At an act A10, the image data of an image to be analyzed is accessed.

At an act A12, the image data of the image is processed on a global basis (e.g., entirety of the image) to determine an amount of skin content present in the image. In one embodiment, colors which match the color of skin are used to determine the amount of skin content. In one example, a region (gamut) of a two-dimensional plot of Cr, Cb chrominance values of a YCC color space may be defined (e.g., using a training set of color balanced images which include skin) which describes the color of skin. If the Cb, Cr components of a given pixel of an image map in this region, then it would be counted as a pixel comprising skin content. Furthermore, at act A12, it is determined whether the image contains sufficient skin content on a global basis where skin-detection processing of the image is appropriate. In one embodiment, the amount of skin content of the image may be compared with a threshold (e.g., number of pixels) to determine whether sufficient global skin content exists. Different thresholds may be used in different applications to provide a desired balance of accuracy and efficiency.

If sufficient global skin content is determined to not be present in the image, the method of FIG. 3 assumes that the camera may have not selected the chrominance correctly for capturing the image and the color balance of the image may not be accurate. In addition, the image is processed without skin-detection processing at an act A14 in an effort to reduce the chances of the skin-detection processing erroneously indicating that one or more portions of the image are void of a human face.

If sufficient skin content is determined to be present on a global basis, the method of FIG. 3 further analyzes the image data of the image to further select which of the face-detection processes (act A18 or act A20) and which both utilize skin-detection processing is to be used to process the image. More specifically, as indicated at an act A16, the processing circuitry 10 may analyze pixels of a portion of the image which frequently contains human faces to determine whether sufficient skin content is present in the portion, for example as described above with respect to act A12 in one embodiment. In one embodiment, the method analyzes a center portion of the image to determine whether sufficient skin content is present in the selected portion. Portions other than the center may be used in other embodiments. In one embodiment, another threshold may be used to determine whether sufficient skin content is present in the portion being analyzed.

At an act A18, skin-detection processing is performed for the face-detection processing of an entirety of the image responsive to sufficient human skin content being present in the center portion of the image at act A16.

Alternatively, if sufficient skin content is not present at act A16, face-detection processing is performed without skin detection for the center portion while face-detection processing using skin-detection processing is performed for the remainder of the image at the process of act A20. Accordingly, one of the face-detection processes of the example method of FIG. 3 uses skin-detection processing for less than an entirety of the image during the face-detection processing of the image.

The example method described above performs analysis at act A16 to determine which of the different face-detection processes of acts A18 and A20 should be used if the image contains sufficient global human skin content at act A12 (e.g., a sufficient number of pixels are within the gamut corresponding to skin). In another embodiment, the processing of act A16 may be omitted and the processing circuitry 10 may proceed to use skin-detection processing of an entirety of the image at act A18 if the image is found to contain sufficient global human skin content at act A12.

At an act A22, the image is processed using the selected one of the different face-detection processes in an attempt to detect human faces in the image.

Accordingly, as described in the example of FIG. 3, the image data of the image may be processed to select one of a plurality of different face-detection processes which is to be used to detect human faces in the image. Accordingly, different face-detection processes may be used to process different images in one embodiment.

The protection sought is not to be limited to the disclosed embodiments, which are given by way of example only, but instead is to be limited only by the scope of the appended claims.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A face-detection processing method comprising:
accessing image data of a plurality of images to be processed for detection of human faces in the images;
determining whether or not to use skin-detection processing for face-detection processing of individual ones of the images based on an amount of human skin content of the individual ones of the images; and
in accordance with the determining, performing the face-detection processing of one of the images using the skin-detection processing to detect human faces in the one of the images, including performing the face-detection processing using the skin-detection processing for an entirety of the one of the images based on an amount of human skin content of a portion of the one of the images being greater than a threshold, and performing the face-detection processing using the skin-detection processing except for the portion of the one of the images based on the amount of human skin content of the portion of the one of the images being less than the threshold.

2. The method of claim 1 wherein the performing the face-detection processing comprises performing the face-detection processing of the one of the images using the skin-detection processing based on an amount of human skin content for an entirety of the one of the images being greater than a global threshold.

3. The method of claim 1 further comprising, in accordance with the determining, performing the face-detection processing of another of the images without using the skin-detection processing to detect human faces in the another of the images based on an amount of human skin content for an entirety of the another of the images being less than a global threshold.

4. The method of claim 1 wherein the determining comprises determining using the image data of the images.

5. The method of claim 1 wherein the performing the face-detection processing of the one of the images comprises performing the skin-detection processing for less than an entirety of the one of the images.

6. The method of claim 1 wherein the performing the face-detection processing of the one of the images comprises performing using the skin-detection processing as a pre-filter configured to expedite the face-detection processing of a portion of the one of the images compared with the face-detection processing of the portion of the one of the images in an absence of the skin-detection processing.

7. The method of claim 1 wherein the performing the face-detection processing of the one of the images comprises identifying a portion of the one of the images void of any human faces prior to executing a face-detection method of the face-detection processing for the portion.

8. The method of claim 1 wherein the performing comprises performing the face-detection processing of the one of the images using an imaging device at a first moment in time and performing the face-detection processing of another of the images using the imaging device at a second moment in time.

9. An image processing device comprising:
processing circuitry configured to access image data of an image, to select, in response to an amount of human skin content of the image, one of a plurality of different face-detection processes which are individually configured to detect human faces, and to process the image data of the image using the selected one of the different face-detection processes to detect human faces in the image,
wherein the processing circuitry is configured to perform face-detection with skin-detection for an entirety of the image in response to an amount of human skin content of a portion of the image being greater than a threshold, and perform face-detection with skin-detection except for the portion of the image in response to the amount of human skin content of the portion of the image being less than the threshold.

10. The device of claim 9 wherein the processing circuitry is configured to perform the face-detection with skin-detection in response to an amount of human skin content for an entirety of the image being greater than a global threshold, and wherein the processing circuitry is configured to perform face-detection without skin-detection in response to the amount of human skin content for the entirety of the image being less than the global threshold.

11. The device of claim 9 wherein the processing circuitry is configured to select one of the face-detection processes for processing of the image and to identify a portion of the image void of human faces using skin-detection prior to execution of face-detection for the portion.

12. The device of claim 9 wherein the processing circuitry is configured to use the image data of the image to select the one of the different face-detection processes.

13. The device of claim 9 wherein the image processing device comprises an image capture device, and the processing circuitry comprises processing circuitry of the image capture device.

14. An article of manufacture comprising:
non-transitory computer-readable media comprising programming configured to cause processing circuitry to perform processing comprising:
accessing image data of a plurality of images; and
performing face-detection processing of the image data of the images to attempt to detect human faces in the images;
wherein, with an amount of human skin content of a portion of one of the images being greater than a threshold, the performing comprises performing the face-detection processing using skin-detection processing for an entirety of the one of the images, and wherein, with the amount of human skin content of the portion of the one of the images being less than the threshold, the performing comprises performing the face-detection processing using the skin-detection processing except for the portion of the one of the images.

15. The article of claim 14 wherein, with an amount of human skin content for an entirety of the one of the images being greater than a global threshold, the performing comprises performing the face-detection processing using skin-detection processing, and wherein, with the amount of human skin content for the entirety of the one of the images being less than the global threshold, the performing comprises performing the face-detection processing without using skin-detection processing.

16. The method of claim 1 wherein the portion of the one of the images comprises a center region of the one of the images.

17. The device of claim 9 wherein the portion of the image comprises a center region of the image.

18. The article of claim 14 wherein the portion of the one of the images comprises a center region of the one of the images.

* * * * *